United States Patent Office 3,306,475
Patented Feb. 28, 1967

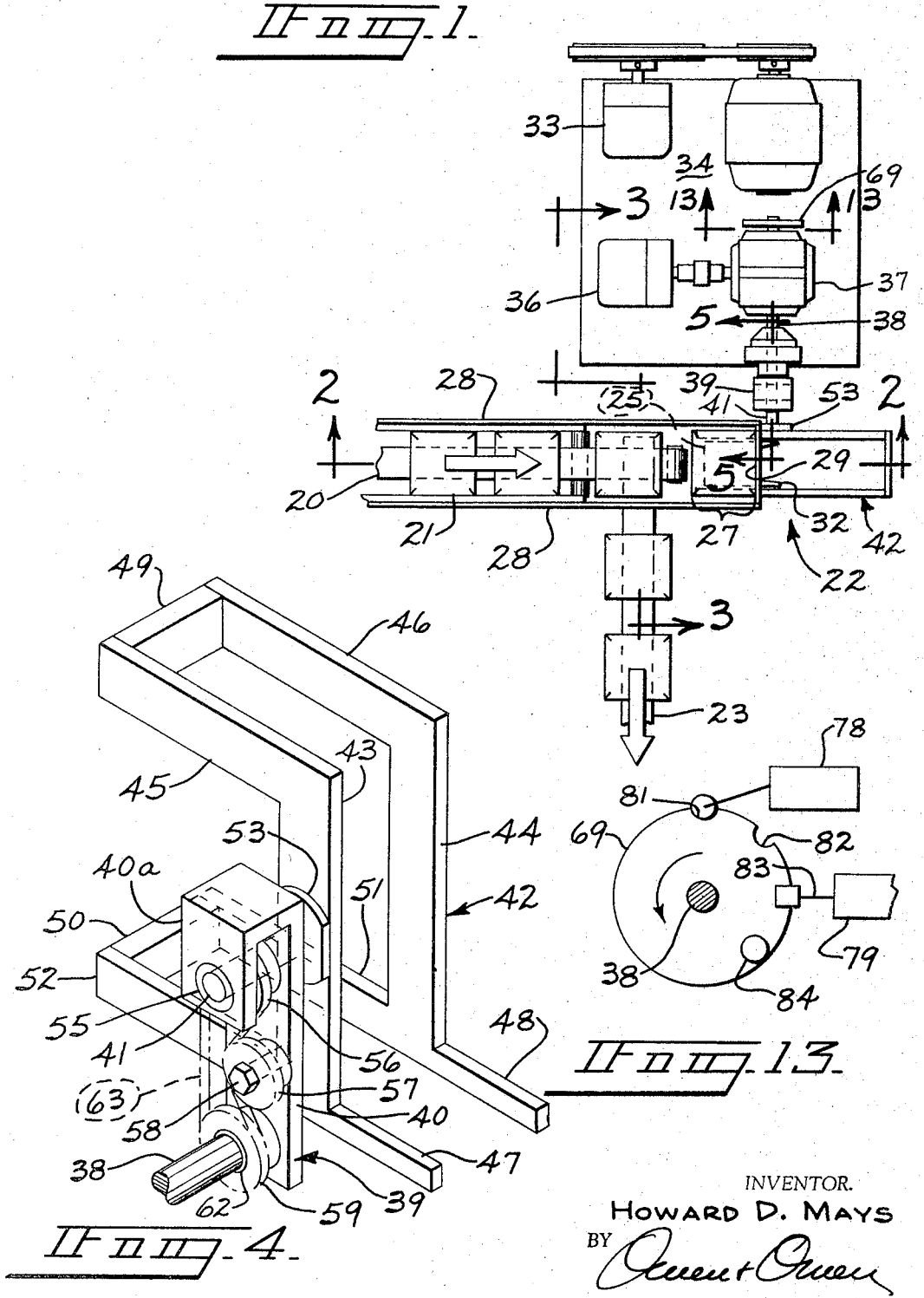

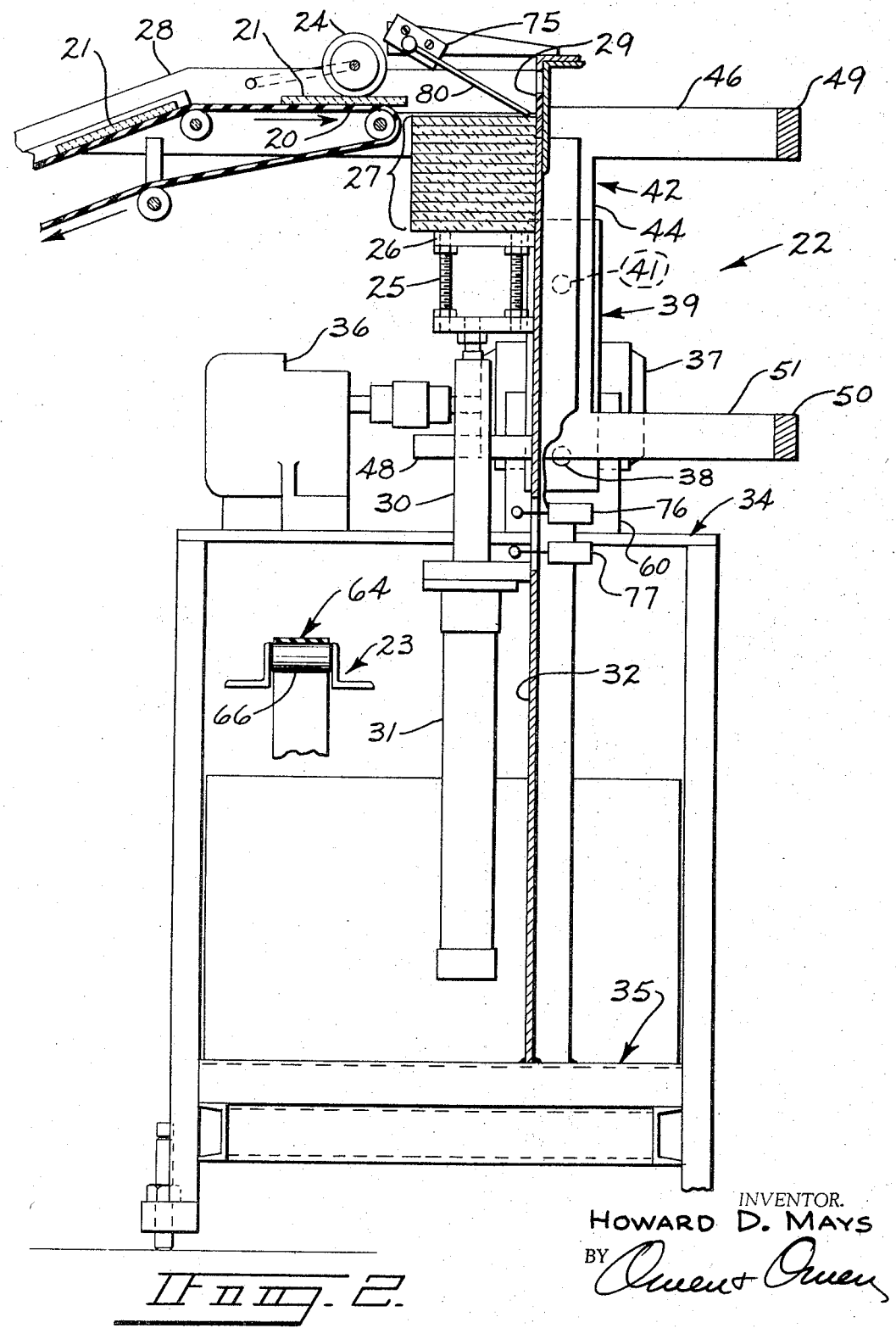

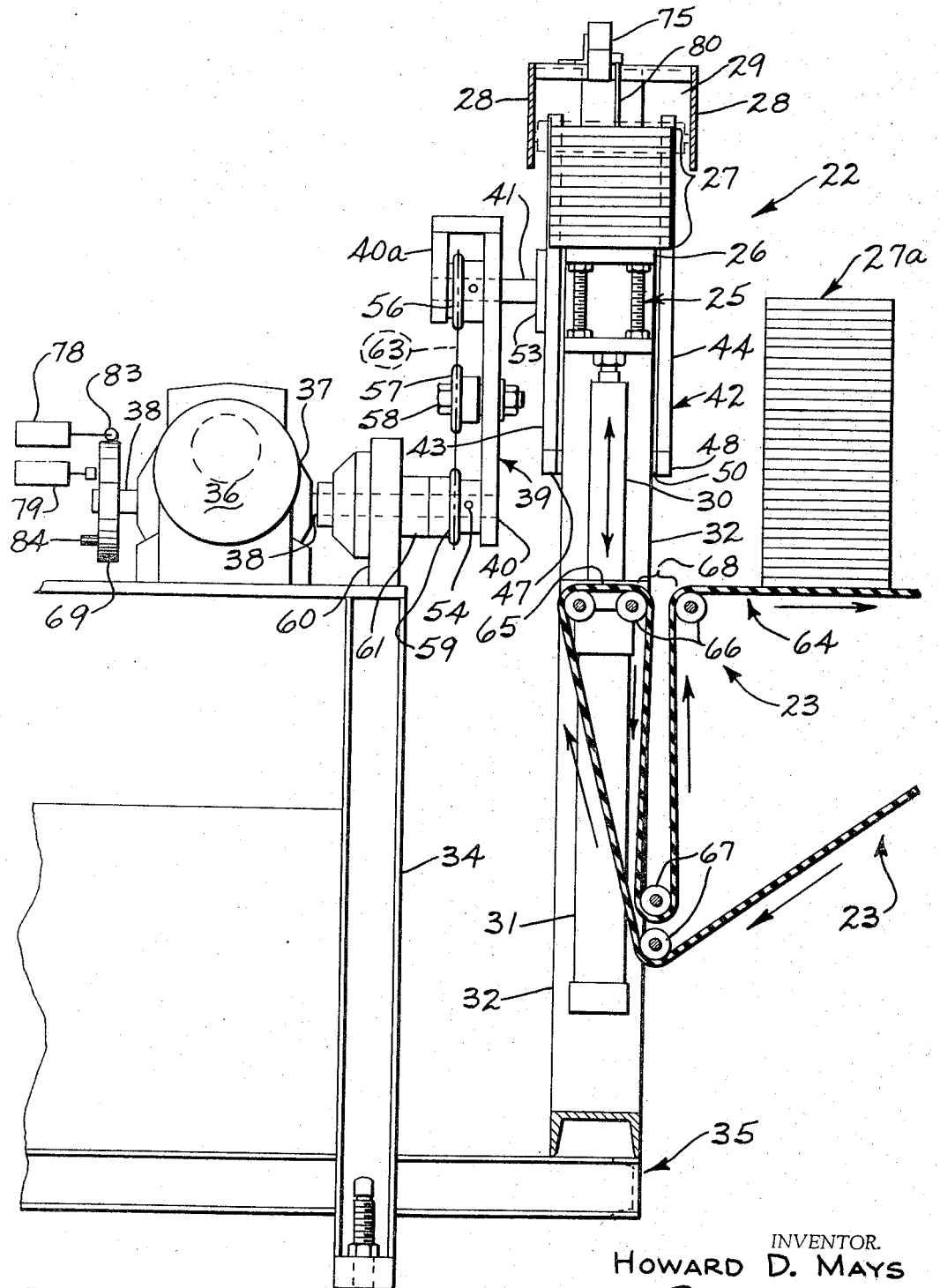

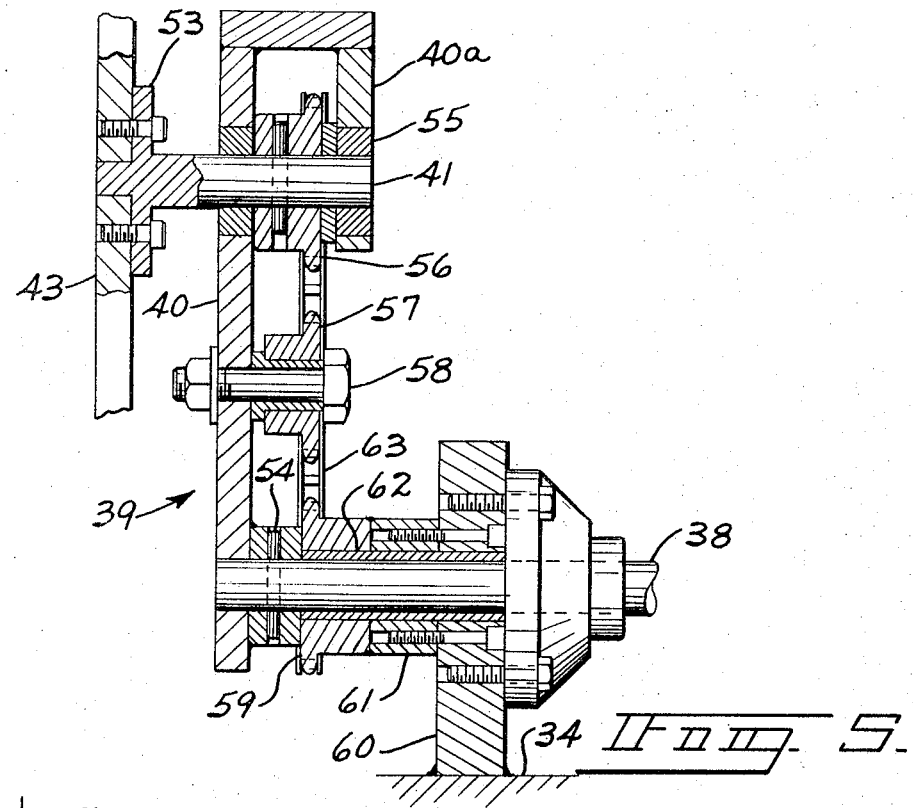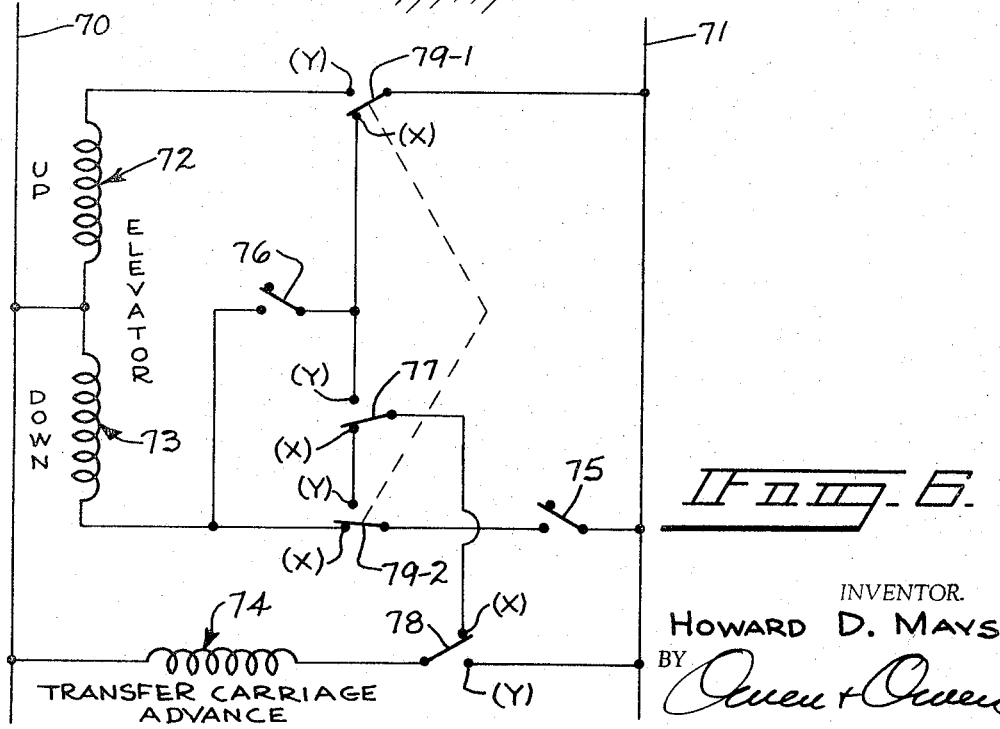

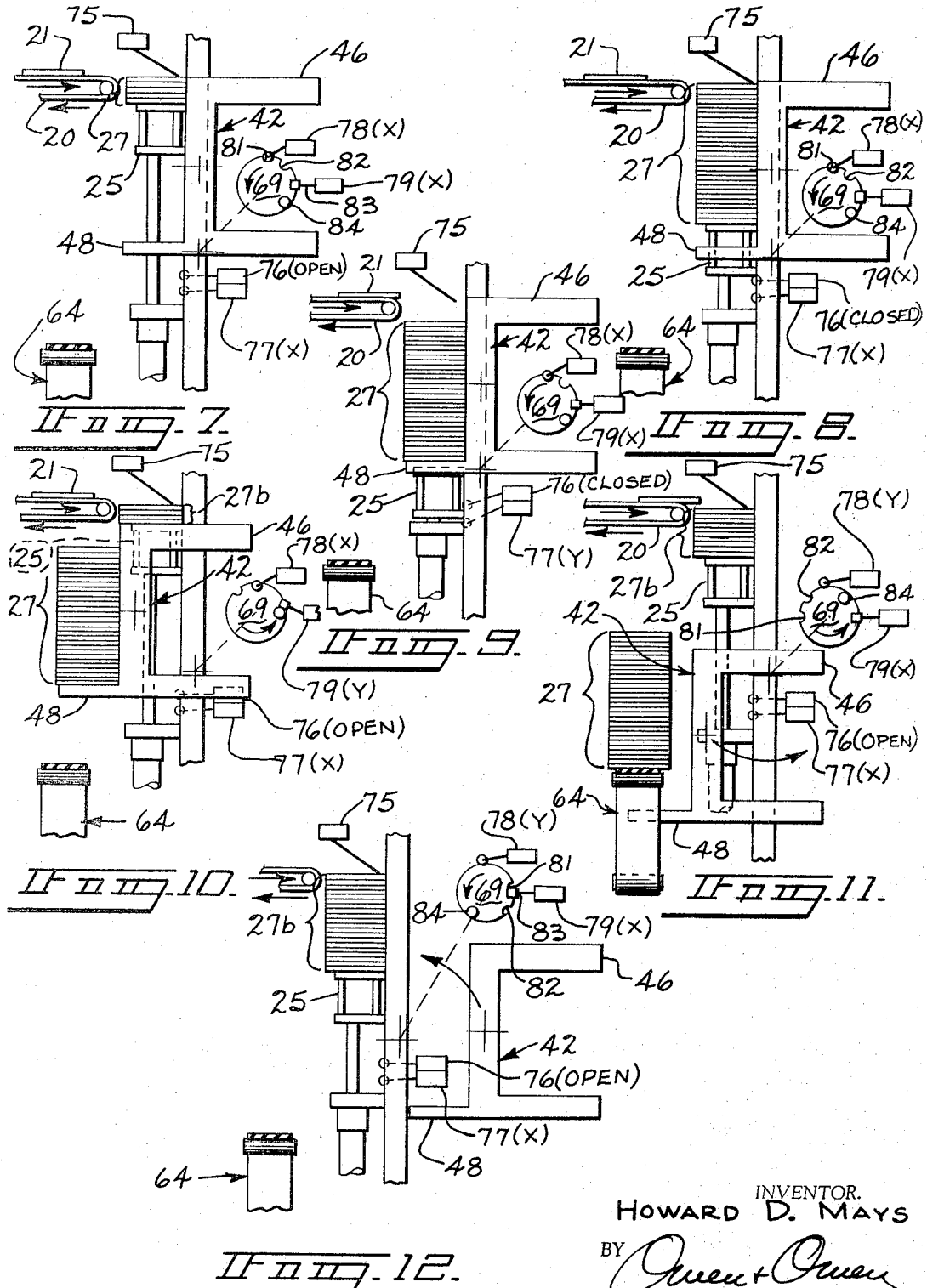

3,306,475
STACKING APPARATUS
Howard D. Mays, Zanesville, Ohio, assignor to The Mosaic Tile Company, Cleveland, Ohio, a corporation of Ohio
Filed Dec. 30, 1963, Ser. No. 334,226
15 Claims. (Cl. 214—6)

This invention relates to an apparatus for accumulating stacks of generally flat objects serially delivered to the apparatus by a conveyor mechanism and depositing the accumulated stacks or vertical rows of such flat objects at a remote station such as upon a second conveyor mechanism.

The automatic stacking apparatus contemplated by this invention includes an elevator for receiving the generally flat objects from a conveyor and a movable transfer carriage which receives stacks of such flat objects from the elevator and places the stacks at a second remote station.

For purposes of illustration, the concepts of this invention will be presented with respect to a stacking apparatus designed to serially receive uncured ceramic tiles or green goods from a conveyor belt to accumulate such objects in vertical stacks and to deposit each stack of such uncured ceramic tiles upon a second conveyor belt. It will be appreciated, of course, that this is but one of many embodiments of the present invention which is useful in collecting and stacking many types of generally flat objects as they are serially received from a supply and in placing stacks of such objects on a second remote surface or a second conveyor. It will be appreciated therefore that this invention is not limited to use in stacking uncured ceramic tiles but has many applications as will be set forth below.

In the manufacture of ceramic tiles, the first step is to mold a body from a suitable mixture of finely ground clay to which has been added a small percentage of binder, often merely water. These bodies are formed in a tile press which delivers them one after another onto a conveyor belt. The bodies move along the conveyor belt to an operator's position where they are collected in groups of, say, fifteen, twenty-five, or fifty, and placed in refractory boxes or "saggers" which hold the pressed bodies as they pass through a kiln. Because the pressed bodies, referred to in the trade as "green goods," are very fragile and are easily scuffed, nicked or broken, extreme care is required when removing them from the conveyor belt, assembling them in groups and placing the groups in the saggers. Prior to the instant invention, these steps were manually performed by operators but the practice of having one or more persons manually remove the fragile bodies from the conveyor belt, manually assemble the groups and manually place the groups in the saggers has several disadvantages.

Because of the extreme care required of a person stacking the fragile green goods, this job is particularly tedious and tiring, necessitating frequent rest periods and rotation of personnel. This, of course, requires that a number of persons be employed to manually stack the tile or that the conveyor be shut down during the rest periods.

A second disadvantage results from the fact that the surfaces of the green goods dry rapidly so that the fine powdered clay rubs off easily and a person who is manually handling the tiles quickly becomes covered with the "dust" or fine powder.

A third disadvantage is the fact that manually handling the green goods with the degree of care required so as not to injure them is slow and time consuming. Since all of the bodies on the conveyor belt from the tile press must be removed and placed in groups of approximately fifteen to fifty to be placed in saggers, at least one operator is needed for each press in order to avoid limiting the production rate of the tile press.

It is to be appreciated that many of the disadvantages of the prior practice of manually grouping green goods apply equally well to many manufacturing processes wherein generally flat objects are received from the first conveyor and are required to be removed and deposited in groups upon a second remote conveyor or surface.

It is an object of this invention to provide an apparatus for accumulating stacks of pressed bodies delivered serially by a conveyor belt and placing the stacks of the bodies on a second remote conveyor belt.

It is another object of this invention to provide an apparatus for stacking flat objects such as pressed bodies for ceramic tiles to eliminate the tiresome and undesirable job of stacking the bodies so that the personnel heretofore required for manually stacking may be employed in other more useful and desirable positions.

It is a further object of this invention to provide an apparatus capable of receiving flat objects, such as pressed bodies for ceramic tiles, from a first conveyor, accumulating the bodies in stacks of predetermined numbers and placing such stacks on a second remote conveyor, at a rate substantially greater than the manual stacking rate of one or more persons, thus enabling an increase in the rate of production of green goods.

Other and more specific objects and advantages of this invention will be understood from the following specification and from the drawings, in which:

FIG. 1 is a plan view showing an apparatus embodying the invention associated with a first conveyor belt which presents individual pressed bodies to the apparatus and a second conveyor belt on which the stacks of bodies are placed by the apparatus;

FIG. 2 is a vertical sectional view taken along line 2—2 of FIG. 1 and shown on an enlarged scale;

FIG. 3 is a view partly in section and from the position indicated by the line 3—3 of FIG. 1;

FIG. 4 is a greatly enlarged, detailed view in perspective of a part of the stacking apparatus, FIG. 5 is a still further enlarged, fragmentary sectional view taken along the line 5—5 of FIG. 1 and showing details of the mechanism connecting a drive motor and part of the apparatus;

FIG. 6 is a schematic circuit diagram showing the electrical circuitry employed in a preferred embodiment of the invention;

FIGS. 7 through 12 are fragmentary, schematic front views on a smaller scale, of the apparatus embodying the invention and showing the apparatus in various positions during a cycle of operation; and FIG. 13 is a detail view in elevation taken along line 13—13 of FIG. 1 and shown on an enlarged scale.

An automatic stacking apparatus embodying the instant invention is shown in the drawings associated with two conveyor belts for use in stacking pressed bodies or green goods in a ceramic tile manufacturing process. As briefly explained above, a press for ceramic tile bodies delivers each body to a conveyor belt which moves away from the press towards the stacking apparatus. These bodies are to be collected from the conveyor belt, accumulated in vertical stacks of approximately fifteen to twenty-five and then placed on a second conveyor belt which removes the stacks from the vicinity of the stacking apparatus.

Referring specifically to FIG. 1, supply conveyor belt 20 carries the bodies 21 toward the stacking apparatus of this invention, which is generally indicated by the reference number 22. After the bodies 21 have been accumulated by the stacking apparatus 22, the stacks are placed upon an outgoing conveyor belt 23 which conveys the stacks to a station where an operator places the stacks in saggers (not shown) which are then placed in a kiln. While the conveyor 20 is considered herein as leading from a press (not shown) in which the bodies 21 are formed, this is merely illustrative of the type of materials which an apparatus embodying the invention is capable of handling.

As best shown in FIG. 2, as each of the bodies 21 approaches the end of the supply conveyor belt 20, it travels beneath a guide roller 24 which maintains the bodies 21 flat on the conveyor belt 20 in a substantially horizontal position until their trailing edges have passed from beneath the guide roller 24. The span of the conveyor 20 extends to a point adjacent the vertical path of travel of an elevator 25 which has a platform 26 upon which a first body 21 or a stack 27 of bodies rests. When the elevator 25 is in its upper position, a body 21 passes off of the conveyor belt 20 directly onto the platform 26. As will be explained below, subsequent bodies 21 come to rest upon preceding bodies 21 to form the stack 27, as shown in FIGS. 2 and 3.

Sidewalls 28 which extend alongside the end of the conveyor belt 20, as shown in FIGS. 1, 2 and 3, are connected at their ends by a stop plate 29. As the bodies 21 leave the end of the conveyor belt 20, their momentum is sufficient to carry them into contact with the stop plate 29, insuring vertical alignment of the bodies 21 in the stack 27.

The elevator 25 is mounted on the upper end of a piston 30 of a cylinder 31 which is supported in vertical position by an upright 32. The stop plate 29 and the web of the upright 32 lie in the same vertical plane for guiding the bodies 21 (see FIG. 2). The cylinder 31 functions to move the elevator 25 up and down along the upright 32. Hydraulic fluid is supplied to the cylinder 31 by a motor driven fluid pump 33 (see FIG. 1). The fluid pump 33 is mounted on a table 34 which has an outboard support frame 35 (see FIGS. 2 and 3) for supporting the upright 32. A fluid motor 36 drives a gear box 37 which has an output shaft 38. A fluid motor 36 and the gear box 37 are also mounted on the table 34.

An L-shaped bridle member 39 (see FIGS. 1, 2, 3 and 5) comprising a main bar 40 is keyed, or otherwise rigidly mounted, on the end of the gear box output shaft 38. The free end of the bridle member 39 has a spaced parallel return arm 40a. A shaft 41 is rotatably mounted parallel to the shaft 38 by the main bar 40 of the bridle 39 and the return arm 40a. The shaft 41 is rigidly secured to and supports a transfer carriage 42, shown in detail in FIG. 4.

The transfer carriage 42 comprises a pair of spaced vertical members 43 and 44, each of which has an upper arm 45 or 46, and an oppositely extending lower arm 47 or 48, respectively. The upper surfaces of the arms 45–46 and of the arms 47–48 lie in parallel spaced planes. The members 43 and 44 are spaced and held in fixed relationship by an upper spacer 49 and by a lower spacer 50 which extends between two bars 51 and 52 at the lower ends of the members 43 and 44.

The transfer carriage 42 is secured to the shaft 41 for rotation therewith, being carried by a flange 53 on the shaft 41 (see FIG. 5). As mentioned above, the bridle member 39 is secured on the output shaft 38 of the gear box 37 for rotation therewith, for example by a pin 54. The shaft 41 which mounts the transfer carriage 42 is journaled by bearings 55 in the main bar 40 and return arm 40a of the bridle member 39. A sprocket 56 is secured to the rotatable shaft 41, being positioned between the main bar 40 and return arm 40a. An idler sprocket 57 is journaled by a bolt 58 at an intermediate position on the main bar 40 of bridle member 39, the idler sprocket 57 being in alignment with the sprocket 56. A third sprocket 59 is mounted circumjacent to the output shaft 38 in alignment with the sprockets 56 and 57. The third sprocket 59 is welded, or otherwise fixed to a support 60 through a collar 61, the support 60, collar 61 and sprocket 59 also functioning to support a sleeve bearing 62 for the shaft 38. A chain 63 interconnects the sprockets 56, 57 and 59. Rotation of the output shaft 38 rotates the bridle member 39 and causes the transfer carriage 42 to revolve in a circle about the output shaft 38. Because the sprocket is held against rotation by the support 60, the sprocket 56 is caused by the chain 63 to turn in a direction opposite to the direction of rotation of the bridle member 39. This maintains the transfer carriage 42 in constant angular position relative to the support 60, i.e., with its lower arms 47 and 48 in horizontal position. Thus the transfer carriage 42 may be said to translate through a circular path while maintaining its upright position.

The support 60 for the bridle member 39 and transfer carriage 42 is so positioned on the table 34 (see FIGS. 2 and 3) that when the transfer carriage 42 and the bridle member 39 are in their uppermost position the transfer carriage 42 is so located that its lower arms 47 and 48 lie on opposite sides of the vertical path of movement of the elevator 25 at an intermediate level. The lower arms 47 and 48 of the transfer carriage 42 are spaced a distance slightly greater than the horizontal dimension of the elevator 25 and less than the corresponding dimension of a body 21 (see FIG. 3). When the elevator 25 drops below the level of the lower arms 47 and 48, the stack 27 carried by the elevator 25 is placed upon the lower arms 47 and 48 of the transfer carriage 42. The spacers 49 and 50 are spaced from the axis of the output shaft 38 (see FIG. 2) far enough so that the transfer carriage 42 may translate throughout its circular path (counter-clockwise in FIG. 2) around the output shaft 38 without interfering with the operation of the elevator 25, as shown schematically in FIGURES 7 through 12.

As shown particularly in FIG. 3, an outgoing conveyor belt 64 is positioned to receive a stack 27 from the lower arms 47 and 48 of the transfer carriage 42 after it has translated through a portion of its circular path. The belt 64 has a short span 65 which is located directly in the path of the transfer carriage 42 and is led around spacing rollers 66 and lower idler rollers 67 to provide a gap 68 through which the lower arm 48 of the transfer carriage 42 moves as the transfer carriage 42 translates through its circular path. Thus a stack 27 carried by the lower arms 47 and 48 of the transfer carriage 42 is deposited upon the short span 65 of the outgoing conveyor belt 64 by the transfer carriage 42 as it passes through its circular path, as schematically shown in FIG. 11. As shown in FIG. 3, the gap 68 in the belt 64 is sufficiently shorter than the bodies 21 so that the stack 27 deposited upon the short span 65 of the conveyor belt 64 moves across the gap 68 away from the stacker to a station where the stack, for example the stack 27a, can be placed in a sagger.

The transfer carriage 42 has three functions: (1) to receive a stack 27 from the elevator 25 when the transfer carriage 42 is in its initial or highest position (FIGS. 2, 3 and 9); (2) to place such stack 27 upon the short span 65 of outgoing conveyor belt 64 after translating through a portion of its circular path (FIGS. 10 and 11); and (3) to substitute its upper arms 45 and 46 for the elevator 25 as a receiver for bodies 21 coming off the conveyor 20 during a part of a stack transfer cycle. FIG. 10 shows the transfer carriage 42 in an intermediate position between its initial highest position (FIGS. 7, 8 and 9) and its position at which it places the stack of tiles on the outgoing conveyor belt 64 (just preceding FIG. 11). In this intermediate position of FIG. 10, a previous stack 27 is being supported on the lower arms 47 and 48 of the transfer carriage 42 and the upper arms 45 and 46 are receiving the bodies 21 as they drop from the end of the supply conveyor belt 20. The upper arms 45 and 46 continue to receive the bodies 21 from the supply conveyor belt 20 until the elevator 25 returns to its uppermost position which it has just reached in FIG. 10.

In the illustrated embodiment of this invention, control of the flow of hydraulic fluid to the cylinder 31 and the fluid motor 36 causes the movement of the elevator 25 and the transfer carriage 42. Hydraulic valves (not shown) are controlled and actuated by an electric control circuit having a number of control switches which are actuated by the movement of the elevator 25 and by a cam 69 (FIGS. 1, 3 and 13) mounted on the end of the output shaft 38. FIG. 6 is a schematic circuit diagram showing the arrangement of the elevator and cam controlled limit switches used in the preferred embodiment of this invention.

Referring to FIG. 6, terminals 70 and 71 are connected to an appropriate power source. Windings 72, 73 and 74 represent the coils of controls means such as solenoid actuated hydraulic valves which control the upward and downward movement of the elevator 25 and the advance of the transfer carriage 42 through its circular path, respectively. Control switches 75 through 79 are connected as shown in FIG. 6. The switch 79 has two poles, designated 79–1 and 79–2. All of the switches are shown in their positions at the start of a cycle of the stacking apparatus when the elevator is receiving the tiles 21 from the conveyor 20 and the transfer carriage 42 is in its highest position.

A control switch 75 is located at the top of the path of the elevator 25, as shown in FIG. 2. This control switch 75, normally open, is momentarily closed whenever a body 21 passing from the end of the supply conveyor belt 20 strikes an arm 80 which projects into the path of the body 21. The momentary closing of the control switch 75 completes a circuit through the x contact of the pole 79–2 of the switch 79 to the winding 73 which actuates a solenoid valve to admit a pulse of hydraulic fluid to the upper end of the cylinder 31 to lower the elevator 25 a distance corresponding to the thickness of a body 21. Each successive body 21 similarly causes the elevator 25 to move downwardly so that the top of a stack 27 remains at approximately the level of the supply conveyor belt 20. This action is necessary so that the incoming body 21 will neither strike the edge of the top body on the stack 27 nor drop an appreciable distance before it reaches the top of the stack 27, thus avoiding damage to the fragile pressed bodies 21.

A control switch 76 is mounted adjacent the path of the elevator 25 at such position that it is closed by the downward movement of the elevator 25 when a stack 27 of a predetermined number of bodies 21 has been accumulated thereon. As the elevator 25 reaches this position, the bottom tile of the stack 27 comes to rest upon the lower arms 47 and 48 of the transfer carriage 42 (schematically shown in FIG. 9). Closing the control switch 76 completes a circuit through the x contact of the pole 79–1 of the control switch 79 to the winding 73 which shifts the solenoid valve to initiate a continuous downward movement of the elevator 25 leaving the stack 27 behind on the lower arms of the transfer carriage 42.

A control switch 77 is also mounted adjacent the path of the elevator 25 (FIG. 2) and is actuated by the elevator 25 as it approaches its lowest position. The control switch 77, a double throw type, is in its lower or x position, at the start of a cycle, as schematically shown in FIG. 6. Actuation of the control switch 77 shifts it to its upper y position. When the control switch 77 is moved to its y position, a circuit is completed to the winding 74 through the x contact of the pole 79–1 of the control switch 79, and the x control of the control switch 78 which shifts a solenoid valve to supply fluid to the fluid motor 36 to start the rotation of the shaft 38 and translation of the transfer carriage 42 through its circular path from its initial position.

A control switch 78, a double throw type, is mounted adjacent the cam 69 on the output shaft 38 and is actuated by notches 81 and 82 in the periphery of the cam 69 (see FIG. 13). The cam 69, the notches 81 and 82 and the control switch 78 also are schematically shown in FIGURES 7 through 12. The control switch 78 is in its upper or x position at the start of a cycle as shown in FIGS. 6 and 7. The initial increment of rotation of the output shaft 38 and the cam 69 (caused by the movement of the control switch 77 to its y position) in a counter-clockwise direction, as shown in FIGS. 7 through 12, causes the actuator of the control switch 78 to leave the notch 81, shifting the control switch 78 to y position. This completes a direct circuit to the winding 74 which continues the feed of fluid to the fluid motor 36 and continues the translation of the transfer carriage 42. Movement of the transfer carriage 42 from its initial position (FIGS. 7–9) moves its upper arm 45 and 46 into position to receive the incoming bodies 21. After the transfer carriage 42 has been translated a distance such that the stack 27 on the arms 47 and 48 is moved out of the path of the elevator 25, and the cam 69 is turned through a predetermined arc (FIG. 10), the actuator of the control switch 78 drops into the second notch 82 in the cam 69 and the switch 78 is returned to its x position. The return of the switch 78 to its x position breaks the direct circuit to the winding 74 and stops the translation of the transfer carriage 42. Both poles of the control switch 79 are actuated simultaneously by an actuator 83 which is engaged by a peg 84 on the cam 69 (FIGS. 7–13). At the same time that the control switch 78 is returned to x position by the notch 82, the peg 84 engages the actuator 83 to move poles 79–1 and 79–2 of the control switch 79 from their x positions (as shown in FIG. 6) to their y position. This completes a circuit to the winding 72 to cause the upward movement of the elevator 25 and the circuit through the control switch 75 and breaks the x contact of the pole 79–2 of the control switch 79 to the winding 73 controlling the downward movement of the elevator 25.

As shown in FIG. 10, the upward movement of the elevator 25 returns the control switch 77 to its x position and opens the control switch 76. The elevator 25 continues upwardly until it reaches its uppermost position where the bodies 21 of the stack 27b are received from the upper arms 45 and 46 of the transfer carriage 42. The next body 21 leaving the supply conveyor belt 20 momentarily closes the control switch 75 to complete a circuit to the winding 74 through the y contact of the pole 79–2 of control switch 79, the x contact of the control switch 77 and the x contact of the control switch 78. Completion of this circuit initiates translation of the transfer carriage 42 from its intermediate position shown in FIG. 10 through the remainder of a revolution (see FIGS. 11 and 12).

This initial movement of the transfer carriage 42 and the cam 69 causes the roller of the control switch 78 to leave the notch 82 and to shift the switch 78 to the y position and at the same time causes the peg 84 to release the control switch 79 so that both poles 79–1 and 79–2 return to the x position as shown in FIG. 11. By returning both poles 79–1 and 79–2 of the control switch 79 to their x positions, the circuit to the winding 72 controlling the upward movement of the elevator 25 is broken and the circuit to the winding 73 controlling the downward movement of the elevator 25 through the control switch 75 is restored, so that the elevator 25 is ready for its stepwise downward movement when the first control switch 75 is momentarily closed by a body 21 striking the arm 80.

As the transfer carriage 42 continues its movement, it passes through the position shown in FIG. 11 after placing the stack 27 carried by the lower arms 47 and 48 on the span 65 of the outgoing conveyor belt 64.

As the transfer carriage 42 nears its initial position shown in FIG. 7, the roller of the control switch 78 strikes the notch 81 causing the control switch 78 to shift to its x position, thus breaking the direct circuit to the control winding 74 and stopping the transfer carriage 42 in its initial upright position. The control circuit is now restored to the condition shown in FIG. 6 and the elevator 25 and transfer carriage 42 have started another cycle of operation with a new stack of tiles 27b (FIG. 11) on the elevator 25 ready to be transferred to the lower arms 47 and 48 of the transfer carriage 42. The cycle of the transfer carriage 42 will be started when the elevator 25 has moved down in stepwise increments to its position in FIG. 8 where it closes the control switch 76.

It is to be appreciated that the preferred embodiment disclosed and described herein has several features which may be advantageously used in many installations for stacking various flat objects.

A first such advantage is the fact that the number of items per stack may be varied by adjusting the vertical positions of the control switches 76 and 77 relative to the highest point of the elevator 25. By increasing this distance that the elevator 25 must move downwardly before it closes the control switch 76, the number of items per stack may be increased. Thus, by use of an adjustable mounting for the second control switch 76, the number of flat objects per stack may be easily and simply preset by an operator prior to starting the stacking apparatus.

A second advantage of the stacking apparatus described is the fact that a stack is removed from the elevator 25 and placed on the outgoing conveyor belt 64 with substantially no sliding contact between the bottom tile of the stack, the lower arms 47 and 48 of the transfer carriage 42 and the surface of the outgoing conveyor belt 64. Due to the fragile and soft nature of the uncured bodies or "green goods," an appreciable amount of sliding contact with another object is likely to cause a furrow or scratch on the surfaces of the uncured bodies which would appear on the tile after it is cured. Since the elevator 25 places the stack 27 directly upon the lower arms 47 and 48 of the transfer carriage 42 by passing downwardly between the lower arms 47 and 48 while they are stationary, no such sliding contact occurs. When the stack 27 is transferred from the lower arms 47 and 48 of the transfer carriage 42 to the outgoing conveyor belt 64, there is very little or no sliding contact since the motion of the transfer carriage 42, relative to the outgoing conveyor belt 64, is substantially downward. Also, when the new stack 27b (FIGS. 10 and 11) is removed by the elevator from the upper arms 45 and 46 of the transfer carriage 42, there is no sliding motion between the bottom body of the new stack 27b and the upper arms 45 and 46 and the elevator 25 since the elevator 25 lifts these tiles directly up from the upper arms 45 and 46.

Another advantage of the stacking apparatus described results from the fact that the stacking apparatus cycle is controlled by the arrival of the items to be collected and stacked from the incoming conveyor, so that the speed of the stacking apparatus operation is determined by the frequency of the arrival of the items on the conveyor belt. Because the stacking cycle is controlled by the arrival of the incoming items, the stacking apparatus of this invention automatically adjusts its frequency of operation in proportion to the frequency of the incoming items, and therefore is capable of operating as slowly or as quickly as is necessary to collect and stack the incoming items without being provided with a separate speed control means.

What I claim is:

1. An apparatus for accumulating stacks of generally flat objects comprising, in combination, an elevator, means responsive to the arrival of each object at said elevator for moving said elevator downwardly a distance equal to the thickness of one of said objects, an object receiver temporarily interposable above said elevator, a stack receiver temporarily interposable in the path of movement of said elevator toward a lowermost position, said object receiver and said stack receiver being held in fixed relation to each other by a common support means, means responsive to the accumulation of a predetermined number of objects on said elevator for moving said elevator to its lowermost position to place said stack on said stack receiver and to then simultaneously (1) interpose said object receiver temporarily above said elevator and (2) move said stack receiver and said stack thereon to a position remote from the path of movement of said elevator, means responsive to the arrival of said stack receiver at such remote position for transferring such stack off of said stack receiver and for returning said elevator from its lowermost position to object receiving position above the temporary level of said object receiver for removing objects from said object receiver, and means responsive to the movement of said elevator to object receiving position for removing said object receiver from temporary object receiving position and for returning said stack receiver to its interposed position.

2. The apparatus of claim 1 wherein the means responsive to the arrival of each object comprises a normally open switch adjacent the object receiving position of said elevator, said switch closed by the arrival of each such object at said elevator causing said elevator to move downwardly in increments equal to the thickness of one of such objects.

3. The apparatus of claim 1 wherein said means responsive to the accumulation of a predetermined number of objects on said elevator for moving said elevator to its lowermost position, comprises a switch adjacent the path of said elevator at a vertical distance from the temporary position of said object receiver equal to the height of a stack having a predetermined number of objects, the downward movement of said elevator past said switch actuating said switch.

4. The apparatus of claim 1 wherein said object receiver and said stack receiver are parts of a transfer mechanism comprising a member having a first pair of horizontal object receiving arms for receiving such objects when interposed temporarily in said object receiving position and a second pair of horizontal stack receiving arms for receiving such stacks from said elevator when interposed temporarily in said stock receiving position in the path of movement of said elevator toward its lowermost position for transferring such stacks to a remote station when at stack transferring position at such remote station.

5. The apparatus of claim 4 and a motor means, an elongate bridle member having one end rotatably connected to said transfer mechanism and the other end fixed to the drive shaft of said motor means, and means for controlling the movement of said transfer mechanism relative to said bridle member such that the rotation of said drive shaft and bridle member translates said transfer mechanism through a circular path around said drive shaft while said object receiving and stack receiving arms are maintained in horizontal position as they pass through their object receiving, stack receiving and stack transferring positions.

6. The apparatus of claim 5 wherein the arms of each pair of object receiving arms and stack receiving arms are spaced apart a distance greater than the width of said elevator but less than the width of such flat objects whereby said elevator passes between said arms to deposit such stacks upon said pair of stack receiving arms when temporarily interposed in the path of movement of said elevator toward its lowermost position and to remove objects from said pair of object receiving arms temporarily interposed in object receiving position.

7. The apparatus of claim 6 and a conveyor adjacent the circular path of said transfer mechanism at said stack transferring position, said conveyor comprising a span smaller than the distance between said arms of said pair of stack receiving arms and a main portion spaced from said span a distance sufficient such that one of said arms will pass between said span and said main portion, said span being located in the circular path of said stack receiving arms to receive a stack therefrom as said transfer mechanism and stack receiving arms pass by on their circular path.

8. The apparatus of claim 1 wherein said elevator when in object receiving position and said object receiver when interposed temporarily above said elevator are positioned adjacent the delivery end of a conveyor for receiving horizontally disposed flat objects serially from said conveyor.

9. An apparatus for accumulating stacks of generally flat objects which are serially delivered by a conveyor and for depositing such stacks at a remote station comprising, in combination,
  (1) an elevator adjacent the delivery end of said conveyor for receiving such flat objects from said conveyor,
    (a) said elevator being movable from an upper position
    (b) through a receiving zone to an intermediate position
    (c) and thence to a lower position and back to said upper position,
  (2) means for transferring such stacks from said elevator to said remote station, said means comprising
    (a) a first member movable between a first position at the intermediate position of said elevator for receiving such stacks from said elevator and a second position at said remote station for delivering such stacks thereto,
    (b) a second member movable between a first position remote from said elevator and the delivery end of said conveyor to a second position at the delivery end of said conveyor for receiving such flat objects from said conveyor while said elevator is in said lower position, said first and second means held in fixed relation to one another by a common support means whereby movement of said support means to cause said first member to move from its said first to its said second position will also cause said second member to move from its said first toward its said second position,
  (3) means for moving and controlling the movement of said elevator and said first and second members comprising
    (a) means responsive to the delivery of such flat objects by said conveyor for moving said elevator downwardly from its upper position through said receiving zone to its intermediate position for accumulating a stack of objects on said elevator,
    (b) means responsive to the arrival of said elevator at its intermediate position for causing said elevator to move to its lower position and to deposit such accumulated stack on said first member,
    (c) means responsive to the arrival of said elevator at its lower position for simultaneously
      (i) moving said second member to its second position at the delivery end of said conveyor for receiving such flat objects from said conveyor while said elevator is in its lower position and
      (ii) moving said first member toward its second position at said remote station,
    (d) means responsive to the arrival of said second member at its second position for causing said elevator to return to its upper position to remove such flat objects from said second member and for receiving subsequent flat objects from said conveyor,
    (e) and means conditioned by movement of said elevator from its lower position to its upper position and responsive to the receipt of a subsequent flat object thereon for causing said first member to move to its second position at said remote station and for delivering a previously accumulated stack thereto and for simultaneously returning said first and second members to their first positions.

10. An apparatus for accumulating stacks of generally flat objects which are serially delivered by a conveyor and for depositing such stacks at a remote station comprising, in combination,
  (1) an elevator adjacent the delivery end of said conveyor for receiving such flat objects from said conveyor,
    (a) said elevator being movable from an upper position
    (b) through a receiving zone to an intermediate position
    (c) and thence to a lower position and back to said upper position,
  (2) a transfer carriage for transferring such stacks from said elevator to said remote station comprising
    (a) a first receiver movable between a position at the intermediate position of said elevator and a second position at said remote station for delivering such stacks thereto and
    (b) a second receiver movable between a first position remote from said elevator and from the delivery end of said conveyor to a second position at the delivery end of said conveyor for receiving such flat objects from said conveyor while said elevator is in said lower position,
  (3) means for translating said transfer carriage through a circular path for moving said first and second receivers from their first positions to their second positions and back to their first positions,
  (4) means for moving and controlling the movement of said elevator and said transfer carriage comprising
    (a) means responsive to the delivery of such flat objects by said conveyor for moving said elevator downwardly from its upward position through said receiving zone to its intermediate position for accumulating a stack of objects upon said elevator,
    (b) means responsive to the arrival of said elevator at its intermediate position for causing said elevator to move to its lower position and to deposit such accumulated stack on said first receiver,
    (c) means responsive to the arrival of said elevator at its lower position for moving said second receiver to its second position at the delivery end of said conveyor for receiving such flat objects from said conveyor while said elevator is in its lower position,
    (d) means responsive to the arrival of said second receiver at its second position for causing said elevator to return to its upper position to remove such flat objects from said second receiver and for receiving subsequent flat objects from said conveyor,
    (e) and means conditioned by the movement of said elevator from its lower position to its upper position and responsive to the receipt of a subsequent flat object thereon for causing said first receiver to move to its second position at said remote station for delivering a previously accumulated stack thereto and causing said first and second receivers to return to their first positions.

11. The apparatus of claim 10 wherein said means for translating said transfer carriage comprises an arm having one end secured to a drive motor shaft and the other end rotatably connected to a support shaft secured to said transfer carriage and means connecting said support shaft to said drive motor shaft such that rotation of said drive motor shaft causes translation of said transfer carriage in a circular path about said drive motor shaft wherein said first and second platforms remain in a horizontal position throughout said circular path.

12. An apparatus for accumulating stacks of generally flat objects which are serially delivered by a conveyor and for depositing such stacks at a remote station comprising, in combination,
(1) an elevator adjacent the delivery end of said conveyor for receiving such flat objects from said conveyor,
   (a) said elevator being movable from an upper position
   (b) through a receiving zone to an intermediate position
   (c) and thence to a lower position and back to said upper position,
(2) a transfer carriage for transferring such stacks from said elevator to said remote station comprising
   (a) a first platform movable between a position at the intermediate position of said elevator and and a second position at said remote station for delivering such stacks thereto and
   (b) a second platform movable between a first position remote from said elevator and from the delivery end of said conveyor to a second position at the delivery end of said conveyor for receiving such flat objects from said conveyor while said elevator is in said lower positions, said first and second platforms being held in fixed relation to each other by a common support means whereby movement of said support means to cause said first platform to move from its said first to its said second position will simultaneously cause said second platform to move from its said first position towards its said second position,
(3) hydraulic motor means for moving said elevator up and down and for moving said common support means and thus said first and second platforms from their first positions to their second positions and back to their first positions,
(4) means for controlling the movement of said elevator and first and second platforms comprising
   (a) a normally open switch adjacent the delivery end of said conveyor, said switch momentarily closed by each of said flat objects as they leave said conveyor for moving said elevator downwardly in increments equal to the height of each flat object from its upper position through said receiving zone to its intermediate position for accumulating a stack of objects on said elevator,
   (b) a switch adjacent the path of said elevator at its intermediate position and closed by the arrival of said elevator at this position causing said elevator to rapidly move to its lower position and to deposit such accumulated stack on said first platform,
   (c) a switch adjacent the path of said elevator at its lower position and responsive to the arrival of said elevator at this position for simultaneously (i) initiating movement of said second platform to its second position at the delivery end of said conveyor for receiving such flat objects from said conveyor while said elevator is in its lower position and (ii) movement of said first platform toward its second position,
   (d) a switch responsive to initial movement of said second platform for continuing movement thereof until said second platform reaches its second position,
   (e) a switch responsive to the arrival of said second platform at its second position for causing said elevator to return to its upper position to remove such flat objects from said second platform and for receiving subsequent flat objects from said conveyor,
   (f) and means conditioned by the arrival of said second platform at its second position and by the movement of said elevator from its lower to its upper position and responsive to the momentary closing of said normally open switch for simultaneously causing said second platform to move from its second position and said first platform to move to its second position at said remote station and to deliver a previously accumulated stack thereto and for simultaneously returning said first and second platforms to their first position.

13. An apparatus for accumulating stacks of generally flat objects which are serially delivered by a first conveyor and depositing such stacks upon a second conveyor, comprising, in combination,
(1) an elevator adjacent the delivery end of said first conveyor for receiving such flat objects from such first conveyor when said elevator is at an upper position, said elevator movable through a receiving zone to an intermediate position and thence to a lower position and back to said upper position,
(2) a first motor means for operating said elevator,
(3) a transfer carriage comprising
   (a) a pair of spaced apart members having
   (b) a first pair of spaced apart horizontal arms for receiving such flat objects from said elevator when said elevator is in its intermediate position when said transfer carriage is in a first position and for placing a stack of such objects upon said second conveyor belt when said transfer carriage is in a third position,
   (c) and a second pair of spaced apart horizontal arms for receiving such flat objects from said first conveyor when said elevator is in such lower position when said transfer carriage is in a second position,
(4) a second motor means for said transfer carriage,
(5) an elongate bridle member having one end rotatably connected to the transfer carriage and the other end fixed to the drive shaft of said second motor means,
(6) means for controlling the movement of said transfer carriage relative to said bridle member such that the rotation of said drive shaft and bridle member translates said transfer carriage through a circular path around said drive shaft while said first and second pair of arms of said transfer carriage are maintained in horizontal position,
(7) and means controlling the movement of said elevator and said transfer carriage, comprising
   (a) means responsive to the delivery of such flat objects by said first conveyor for moving the elevator downwardly in increments equal to the height of such objects through said receiving zone to its intermediate position for accumulating a stack of objects on said elevator,
   (b) means responsive to the arrival of said elevator at its intermediate position for causing said elevator to move to its lower position and to deposit such stack upon said first pair of arms when said transfer carriage is in a first position,
   (c) means responsive to the arrival of said elevator at its lower position for causing said transfer carriage to move from its first position to its second position where said second pair of arms is at the delivery end of said first conveyor for receiving such flat objects from said first conveyor while said elevator is in its lower position,
   (d) means responsive to the arrival of said transfer carriage at its second position for causing said elevator to return to its upper position to remove such flat objects from said second pair of arms and to receive subsequent flat objects from said first conveyor, (e) and means conditioned by the movement of said elevator from its lower position to its upper position and responsive to the receipt of a subsequent flat object thereon for causing said transfer carriage to advance to its third position where said first pair of arms delivers a previously accumulated stack to said second conveyor and causing said transfer carriage to continue on its circular path and to return to its first position where said first pair of arms is again ready to receive a subsequent stack of objects from said elevator.

14. The apparatus of claim 13 wherein the arms of each pair of horizontal arms are spaced apart a distance greater than the width of said elevator but less than the width of such flat objects such that said elevator will pass between said arms of each pair to deposit such stacks of such flat objects upon said first pair of arms and to remove such stacks from said second pair of arms.

15. The apparatus of claim 14 wherein said second conveyor is adjacent the circular path of said transfer carriage at its said third position, said second conveyor comprising a span smaller than the distance between the arms of said first pair of arms and a main portion spaced from said span a distance sufficient such that one of said arms will pass between said span and said main portion, said span located in the circular path of said first pair of arms to receive a stack of such flat objects therefrom as said transfer carriage passes through its third position.

References Cited by the Examiner
UNITED STATES PATENTS 2,205,767  6/1940  Lamb.
3,127,820  4/1964  Carter _____ 93—93

GERALD M. FORLENZA, *Primary Examiner.*

MORRIS TEMIN, *Examiner.*